US012506347B2

(12) United States Patent
Hessling-von Heimendahl et al.

(10) Patent No.: US 12,506,347 B2
(45) Date of Patent: Dec. 23, 2025

(54) ELECTRIC AIRCRAFT EMERGENCY POWER SUPPLY MODULE

(71) Applicant: Goodrich Lighting Systems Gmbh & Co. KG, Lippstadt (DE)

(72) Inventors: Andre Hessling-von Heimendahl, Koblenz (DE); Robert Trinschek, Hamm (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 879 days.

(21) Appl. No.: 17/706,756

(22) Filed: Mar. 29, 2022

(65) Prior Publication Data
US 2022/0311256 A1 Sep. 29, 2022

(30) Foreign Application Priority Data
Mar. 29, 2021 (EP) .................................. 21165735

(51) Int. Cl.
*H02J 7/00* (2006.01)
(52) U.S. Cl.
CPC ...... *H02J 7/0048* (2020.01); *H02J 7/007186* (2020.01); *H02J 7/007194* (2020.01); *H02J 7/0013* (2013.01); *H02J 2310/44* (2020.01)
(58) Field of Classification Search
CPC ............... H02J 7/0048; H02J 7/007186; H02J 7/007194; H02J 7/0013; H02J 2310/44; H02J 7/007192; H02J 9/04; H02J 7/0016
See application file for complete search history.

(56) References Cited

U.S. PATENT DOCUMENTS

| | | | |
|---|---|---|---|
| 5,396,163 A | 3/1995 | Nor et al. | |
| 5,428,560 A * | 6/1995 | Leon | G01R 31/36 700/298 |
| 6,016,047 A * | 1/2000 | Notten | H01M 10/48 320/128 |
| 8,860,372 B2 | 10/2014 | Guang et al. | |
| 9,395,417 B2 * | 7/2016 | Song | H02J 7/0047 |
| 10,326,292 B2 | 6/2019 | Zeisler et al. | |
| 2001/0001533 A1 | 5/2001 | Stuck Andersen et al. | |

(Continued)

FOREIGN PATENT DOCUMENTS

| | | |
|---|---|---|
| CN | 112255557 A | 1/2021 |
| CN | 112285564 A | 1/2021 |

(Continued)

OTHER PUBLICATIONS

Abstract for CN112255557 (A), Published: Jan. 22, 2021, 1 page.

(Continued)

*Primary Examiner* — Nghia M Doan
(74) *Attorney, Agent, or Firm* — CANTOR COLBURN LLP

(57) ABSTRACT

An electric aircraft emergency power supply module includes at least one electric power cell for storing and supplying electric energy and a controller for controlling charging and discharging of the at least one electric power cell and for determining a charging level of the at least one electric power cell. The controller includes a simulator, which is configured for simulating an electric behavior of at least one temperature sensitive element as a function of the charging level of the at least one electric power cell.

12 Claims, 9 Drawing Sheets

(56) References Cited

U.S. PATENT DOCUMENTS

| | | | |
|---|---|---|---|
| 2002/0146617 A1* | 10/2002 | Johnson ................... | H02J 7/35 |
| | | | 429/7 |
| 2006/0132097 A1* | 6/2006 | Chiang ................. | H01M 10/48 |
| | | | 320/150 |
| 2006/0132098 A1* | 6/2006 | Lin ................... | H01M 10/4257 |
| | | | 320/150 |
| 2008/0136367 A1 | 6/2008 | Adest et al. | |

FOREIGN PATENT DOCUMENTS

| | | | | |
|---|---|---|---|---|
| EP | 1708334 A2 | 10/2006 | | |
| EP | 3633820 A1 | 4/2020 | | |
| WO | 2006115342 A1 | 11/2006 | | |
| WO | WO-2015081636 A1 * | 6/2015 | .............. | B60L 53/80 |
| WO | 2020171442 A1 | 8/2020 | | |

OTHER PUBLICATIONS

Abstract for CN112285564 (A), Published: Jan. 29, 2021, 1 page.
Extended European Search Report for Application No. 21165735.8, mailed Sep. 21, 2021, 10 pages.

* cited by examiner

ELECTRIC AIRCRAFT EMERGENCY POWER SUPPLY MODULE

CROSS-REFERENCE TO RELATED APPLICATIONS

This application claims priority to European Patent Application No. 21165735.8 filed Mar. 29, 2021, the entire contents of which is incorporated herein by reference.

TECHNICAL FIELD

The present invention is in the field of electric aircraft power supply. In particular, the present invention is related to an electric aircraft emergency power supply module.

BACKGROUND

Aircraft usually comprise an electric power system including at least one aircraft power supply, which is configured for supplying electric power to electric consumers of the aircraft. Such aircraft power supplies may include generators driven by the engines and/or electric terminals for connecting an external electric power supply to the aircraft, when the aircraft is located on the ground.

Aircraft further usually comprise at least one electric aircraft emergency power supply module, in order to allow for operating electric consumers of the aircraft, in particular safety relevant electric consumers of the aircraft, in case electric power is not available from the normally used aircraft power supplies.

Electric aircraft emergency power supply modules comprise at least one electric power cell for storing and supplying electric energy. Aircraft further comprise a charge monitor for monitoring and controlling the charging and discharging of the at least one electric power cell.

Over time, the capacity of electric power cells decreases due to aging. The power cells of an electric aircraft emergency power supply module therefore need to be replaced after some time. Since the charge monitor installed within the aircraft is configured for monitoring and controlling the charging and discharging of a predefined type of electric power cells, for example power cells of the NiCd-type, the electric power cells need to be replaced by electric power cells of the same type.

It therefore would be beneficial to provide an electric aircraft emergency power supply module comprising at least one electric power cell, which is capable to replace an existing electric aircraft emergency power supply module and which may be equipped with electric power cells of a different type, without the need for modifying or changing the charge monitor of the aircraft.

SUMMARY

Exemplary embodiments of the invention include an electric aircraft emergency power supply module comprising at least one electric power cell for storing and supplying electric energy and a controller, wherein the controller is configured for determining a charging level of the at least one electric power cell and for controlling the charging and discharging of the at least one electric power cell.

The controller includes a simulator, which is configured for simulating an electric behavior of at least one temperature sensitive element as a function of the charging level of the at least one electric power cell. The simulator is in particular configured such that outputs provided by the simulator cause a charge monitor, which is installed within an aircraft and electrically connected with the electric aircraft emergency power supply module, to control the charging of the electric power cells in correspondence with the current charging state of the at least one electric power cell.

The output provided by the simulator in general does not correspond to the actual temperatures of the electric power cells, and the output provided by the simulator also generally does not correspond to the temperatures of electric power cells of the NiCd-type having the same charging state as the power cells actually installed within the electric aircraft emergency power supply module.

Instead, the simulator is configured for providing, based on the determined current charging state of the electric power cells, outputs which cause the charge monitor installed within the aircraft to control the charging of the at least one electric power cell in accordance with a predefined charging procedure defined for the at least one electric power cell actually installed within the electric aircraft emergency power supply module. For this purpose, the simulator provides outputs that are known to cause the charge monitor, which is configured to work with electric power cells of the NiCd-type, to provide a suitable charging for the at least one electric power cell actually installed within the electric aircraft emergency power supply module. The simulator uses the simulated temperature as a way to encode and indicate a desired charging to the charge monitor.

Controlling the charging of the electric power cells may includes setting or indicating a charging voltage and/or setting a charging current applied to the electric power cells.

Exemplary embodiments of the invention also include an aircraft, such as an air plane or a helicopter, comprising at least one electric aircraft emergency power supply module according to an exemplary embodiment of the invention.

An electric aircraft emergency power supply module including a controller with a simulator according to exemplary embodiments of the invention allows for replacing a conventional electric aircraft emergency power supply module, which comprises electric power cells of a first type, with an electric aircraft emergency power supply module comprising electric power cells of a second type, which differs from the first type, without modifying or replacing the charge monitor. In consequence, an electric aircraft emergency power supply module comprising electric power cells of a first type may be replaced quickly, easily and conveniently by an electric aircraft emergency power supply module comprising electric power cells of a second type, without generating additional effort or costs.

Exemplary embodiments may in particular allow for replacing a conventional electric aircraft emergency power supply module, comprising electric power cells of the NiCd-type, with an electric aircraft emergency power supply module comprising electric power cells having improved electric properties, such as electric power cells of the NiMH-type, without modifying or replacing the charge monitor.

In an embodiment, the simulator is a dedicated electric simulator circuit, which has been designed for providing the desired functionalities.

In an embodiment, the simulator is implemented as a software program, which is operated by a suitable microprocessor. In an embodiment, the controller comprises at least one microprocessor, and the desired functionalities of the controller including the functionalities of the simulator are provided by one or more software programs running on said at least one microprocessor.

In an embodiment, the controller is configured for determining a desired charging current for charging the at least one electric power cell from the determined charging level of the at least one electric power cell and the simulator is configured for simulating the electric behavior of the at least one temperature sensitive element for causing an external charge monitor to supply the desired charging current to the electric aircraft emergency power supply module. The simulator may in particular be configured for simulating the electric behavior of the at least one temperature sensitive element based on a temperature vs. charging current relation of an electric power cell of a NiCd-type.

An electric aircraft emergency power supply module including such a simulator may conveniently replace an electric aircraft emergency power supply module, comprising electric power cells of the NiCd-type, as they are frequently employed in conventional electric aircraft emergency power supply modules.

In an embodiment, the at least one electric power cell of the electric aircraft emergency power supply module is of the NiMH-type. Electric power cells of the NiMH-type have a large capacity-to-weight ratio, i.e. a low weight for a given capacity. They are robust, have a long lifetime and are advantageous from an ecological point of view.

In an embodiment, the simulator is configured for simulating the electric behavior of at least one NTC thermal resistor and/or of at least one PTC thermal resistor. NTC or PTC thermal resistors are frequently employed in conventional electric aircraft emergency power supply modules for monitoring the charging level of the electric power cells. A simulator simulating the electric behavior of at least one NTC thermal resistor and/or of at least one PTC thermal resistor may therefore allow for easily replacing this kind of electric aircraft emergency power supply modules by an electric aircraft emergency power supply module according to an embodiment of the invention.

In an embodiment, the electric aircraft emergency power supply module comprises at least two power supply terminals. The at least two power supply terminals are internally coupled to the at least one electric power cell and they are coupleable to an aircraft power supply for providing an electrical connection between the electric aircraft emergency power supply module and the aircraft power supply. The at least two power supply terminals may in particular have the same configuration as the power supply terminals of conventional electric aircraft emergency power supply modules, in order to allow for replacing conventional electric aircraft emergency power supply modules by electric aircraft emergency power supply modules according to exemplary embodiments of the invention, without modifying or replacing the electric interfaces provided at the aircraft.

In an embodiment, the electric aircraft emergency power supply module comprises at least two status indication terminals. The at least two status indication terminals are internally coupled to the simulator and they are further coupleable to a charge monitor. The simulator is configured to output a status signal on the at least two status indication terminals, the status signal being indicative of the simulated electric behavior of the at least one temperature sensitive element.

Such a configuration may allow for electrically connecting the electric aircraft emergency power supply module with electric interfaces, provided for electrically connecting electric aircraft emergency power supply modules, as they are frequently provided in existing aircraft.

The at least two status indication terminals may in particular have the same configuration as the status indication terminals of conventional electric aircraft emergency power supply modules, in order to allow for replacing conventional electric aircraft emergency power supply modules with electric aircraft emergency power supply modules according to exemplary embodiments of the invention, without modifying or replacing the electric interfaces provided at the aircraft.

The aircraft power supply and the charge monitor may be implemented as two separate components. Alternatively, the aircraft power supply and the charge monitor may be combined with each other forming a single component, and/or they may be integrated into an electric power supply system of the aircraft.

In an embodiment, the electric aircraft emergency power supply module comprises a plurality of electric power cells. The electric power cells may be connected in series and/or in parallel. Providing a plurality of electric power cells allows for expanding the electric capacity of the electric aircraft emergency power supply module.

In an embodiment, the electric aircraft emergency power supply module comprises at least one electric bypass circuit, which is configured for selectively bypassing the at least one electric power cell. An electric bypass circuit allows for selectively routing electric currents, in particular charging and discharging currents, which flow through the electric aircraft emergency power supply module, around the at least one electric power cell. The at least one electric power cell may in particular be bypassed, in order to allow for measuring the internal voltage of the at last one electric power cell, without the measurement being distorted by electric currents flowing through the at least one electric power cell.

Embodiments comprising more than one electric power cell may comprise a single electric bypass circuits, which is configured for collectively bypassing all the electric power cells. Alternatively, an electric aircraft emergency power supply module comprising more than one electric power cell may comprise a plurality of electric bypass circuits. Such an electric aircraft emergency power supply module may in particular comprise a separate electric bypass circuits for each electric power cell, respectively, in order to allow for selectively bypassing each electric power cell individually.

In an alternative embodiment, the electric aircraft emergency power supply module may comprise less electric bypass circuits than electric power cells, wherein each electric bypass circuit is configured for selectively bypassing a group of electric power cells, respectively.

In an embodiment, the controller is configured for repeatedly bypassing the at least one electric power cell and measuring the voltage of the bypassed electric power cell for determining the current charging state of the at least one electric power cell.

In an embodiment comprising more than one electric power cell, the controller may be configured for collectively bypassing all the electric power cells and measuring the total voltage of all electric power cells of the electric aircraft emergency power supply module. Such an embodiment may result in an inexpensive configuration, as only a single electric bypass circuit and a single voltmeter need to be provided.

In another embodiment comprising more than one electric power cell, the controller may be configured for separately bypassing each of the electric power cells and measuring the voltage of each electric power cell individually. Such an embodiment allows determining the current changing state of the electric power cells more accurately. It may further allow for individually adapting the charging of the electric power cells to the individual charging states of each electric power cell, which results in a more gentle charging of the electric power cells.

In a further embodiment comprising more than one electric power cell, the electric power cells may be grouped into a plurality of groups, each group comprising a plurality of electric power cells, and the controller may be configured for separately bypassing each of the groups of electric power cells and measuring the total voltage of each group of electric power cells. Such a configuration provides a compromise between an inexpensive configuration in which all electric power cells are bypassed and measured collectively, and a more expensive configuration, in which all electric power cells are bypassed and measured individually.

In an embodiment, the electric aircraft emergency power supply module comprises at least one temperature sensor which is configured for detecting a temperature of the electric aircraft emergency power supply module and/or for detecting a temperature of the at least one electric power cell. In a configuration comprising more than one electric power cell, the electric aircraft emergency power supply module may comprise a plurality of temperature sensors, in particular a temperature sensor associated with each electric power cell, respectively, in order to allow for individually detecting the temperature of each electric power cell.

In an embodiment, the controller is configured for controlling the charging and discharging of the at least one electric power cell based on the determined charging level of the at least one electric power cell. The controller may in particular be configured for determining the charging level of the at least one electric power cell from a detected temperature and/or from a detected voltage of the at least one electric power cell.

In an embodiment comprising more than one electric power cell, the controller may be configured for collectively controlling the charging and discharging of all electric power cells of the electric aircraft emergency power supply module.

In another embodiment comprising more than one electric power cell, the controller may be configured for individually controlling the charging and discharging of the electric power cells of the electric aircraft emergency power supply module. The controller may in particular be configured for charging at least one of the electric power cells while simultaneously discharging at least one of the electric power cells.

In a further embodiment comprising more than one electric power cell, the electric power cells may be grouped into a plurality of groups, each group comprising a plurality of electric power cells, and the controller may be configured for individually charging and discharging the different groups of electric power cells. The controller may in particular be configured for charging the electric power cells of at least one group while simultaneously discharging the electric power cells of at least one other group.

In a further embodiment, the controller is configured for selectively charging the at least one electric power cell with a high charging current in a rapid charging mode and with a low charging current, which is lower than the high charging current, in a low charging mode. The low charging mode may in particular be a trickle charging mode in which only a comparably very small trickle charge current is supplied to the at least one electric power cell, in order to compensate for a self-discharging of the at least one electric power cell.

By switching the controller to a low charging mode or to a trickle charging mode, in which only a comparatively low charging current is supplied to the at least one electric power cell, the risk of overloading the at least one electric power cell is considerably reduced.

In an embodiment, the controller is configured for determining the maximum load capacity of the at least one electric power cell. The controller may in particular be configured for determining the maximum load capacity of the at least one electric power cell by executing a controlled discharging of the at least one electric power cell and by monitoring the voltage and/or the discharge current of the at least one electric power cell in the course of the discharging.

In an embodiment, the controller is configured for displaying the determined maximum load capacity of the at least one electric power cell at the electric aircraft emergency power supply module, in order to allow for a visual check of the load capacity of the at least one electric power cell.

In an embodiment, the controller is configured for providing a capacity signal indicating the determined maximum load capacity of the at least one electric power cell, in order to allow for a remote check of the load capacity of the at least one electric power cell. The capacity signal may in particular be transmitted into the cockpit of the aircraft and/or to a remote maintenance center.

In an embodiment, the controller is configured for comparing the determined maximum load capacity of the at least one electric power cell with a predefined first threshold and for providing an alarm signal if the determined maximum load capacity of the at least one electric power cell is below the first predefined threshold.

In an embodiment, the controller is configured for comparing the determined maximum load capacity of the at least one electric power cell with a predefined second threshold and for deactivating the electric aircraft emergency power supply module if the determined maximum load capacity of the at least one electric power cell is below the predefined second threshold. The second threshold may be smaller than or equal to the first threshold.

By regularly determining the maximum load capacity of the at least one electric power cell, a reduction of the capacity of the at least one electric power cell, as it may occur due to aging, may be detected, and the at least one electric power cell may be replaced, when the determined maximum load capacity falls below a predefined threshold. As a result, the operational reliability of the electric aircraft emergency power supply module and, in consequence, the safety of the aircraft are enhanced.

In an embodiment, the controller is configured for individually controlling the charging and discharging of each of the plurality of electric power cells. In particular, the controller may be configured for charging at least one of the plurality of electric power cells while simultaneously discharging at least another one of the plurality of electric power cells.

Exemplary embodiments of the invention further include a method of charging at least one electric power cell of an electric aircraft emergency power supply module, the method comprising: determining a charging level of the at least one electric power cell; determining a desired charging current for charging the at least one electric power cell from the determined charging level; and simulating an electric behavior of at least one temperature sensitive element for causing a charge monitor to supply the desired charging current to the electric aircraft emergency power supply module. The additional features, modifications, and effects, described above with respect to the electric aircraft emergency power supply module, in particular with respect to the controller thereof, apply to the method in an analogous manner.

In an embodiment, the method further includes simulating the electric behavior of the at least one temperature sensitive element based on a temperature vs. charging current relation of an electric power cell of a NiCd-type.

BRIEF DESCRIPTION OF THE DRAWINGS

Exemplary embodiments of the invention will be described with respect to the accompanying drawings, wherein.

DETAILED DESCRIPTION

Figure 1A:
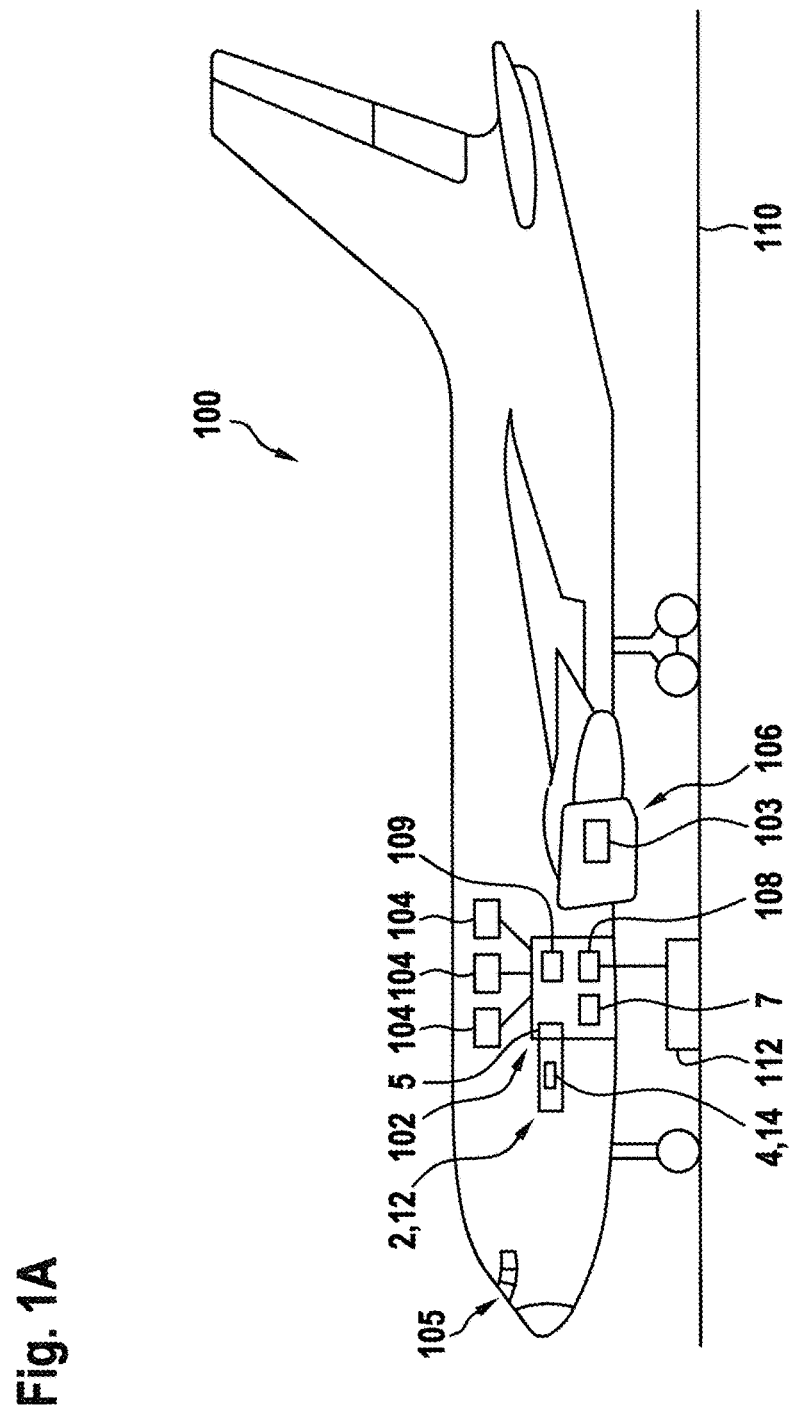
FIG. 1A shows a schematic side view of an air plane in accordance with an exemplary embodiment of the invention.

FIG. 1A shows a schematic side view of an aircraft 100, in particular of an air plane 100, comprising a cockpit 105 and an electric power supply system 102, which is configured for supplying electrical power to electric consumers 104 provided within the air plane 100.

Figure 1B:
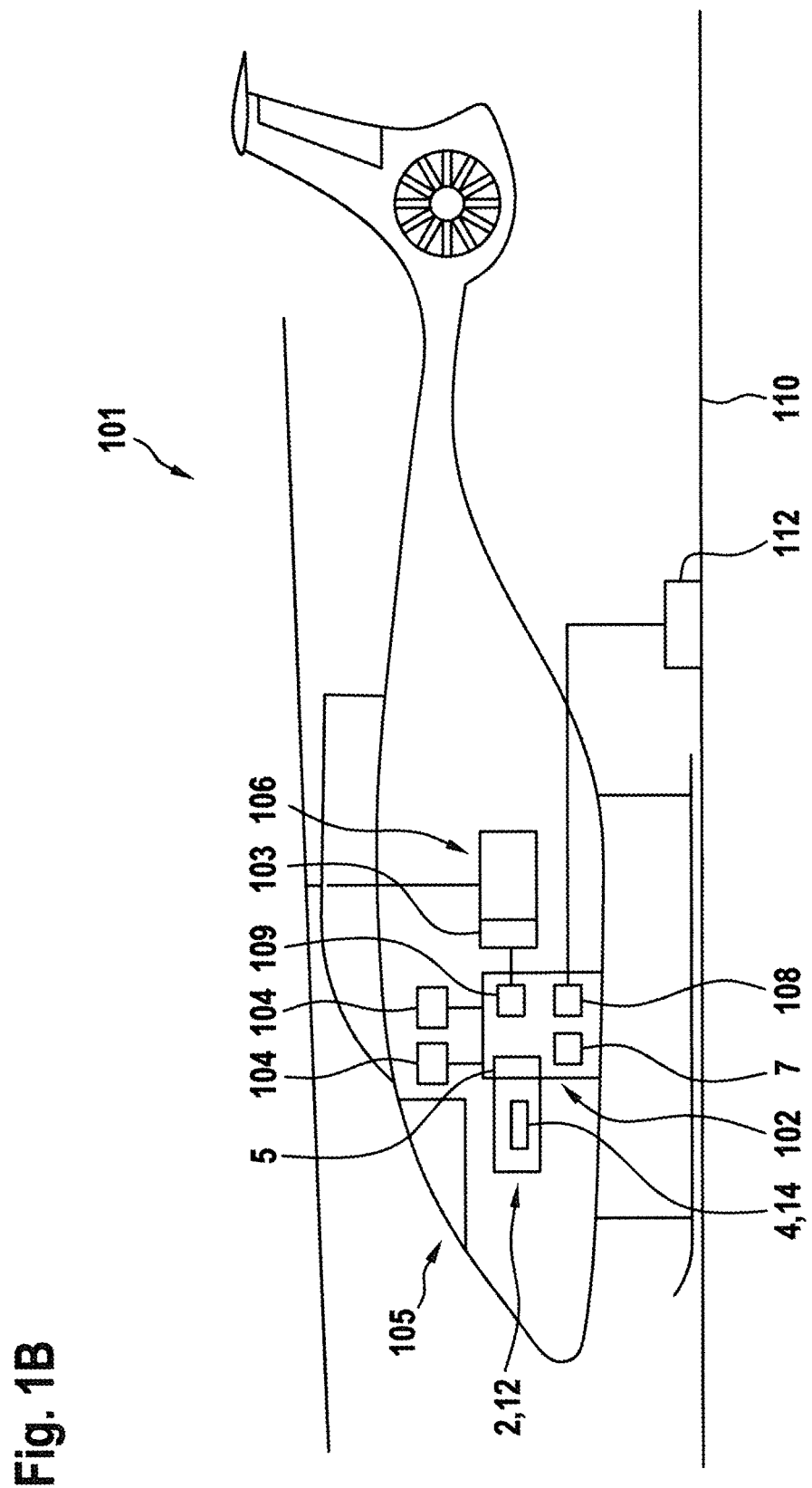
FIG. 1B shows a schematic side view of a helicopter in accordance with an exemplary embodiment of the invention.

FIG. 1B shows a schematic side view of a helicopter 101, comprising a cockpit 105 and an electric power supply system 102, which is configured for supplying electrical power to electric consumers 104 provided within the helicopter 101.

Both the air plane 100 of FIG. 1A and the helicopter 101 of FIG. 1B are aircraft embodied in accordance with exemplary embodiments of the invention.

For both the air plane 100 of FIG. 1A and the helicopter 101 of FIG. 1B, the electric power supply system 102 includes at least one electric generator 103, which is driven by an engine 106 of the aircraft for providing electric power to an internal aircraft power supply 109. The electric power supply system 102 may further comprise an electric power connector 108 for connecting the electric power supply system 102 to an external aircraft power supply 112 when the aircraft is located on the ground 110.

The electric power supply system 102 includes an electric interface 5 for electrically connecting an electric aircraft emergency power supply module 2, 12 to the electric power supply system 102. The electric aircraft emergency power supply module 2, 12 is configured for supplying electric power to the electric power supply system 102 in situations in which electric power is not available from the electric generator 103 or an external aircraft power supply 112.

The electric aircraft emergency power supply module 2, 12 comprises at least one rechargeable electric power cell 4, 14 for storing electric power. The at least one rechargeable electric power cell 4, 14 is regularly charged with electric power provided from the electric generator 103 and/or the external aircraft power supply 112.

The electric power supply system 102 of the aircraft further comprises a charge monitor 7. The charge monitor 7 is configured for monitoring the charging state of the at least one rechargeable electric power cell 4, 14 and for controlling the charging and discharging of the at least one rechargeable electric power cell 4, 14.

Figure 2A:
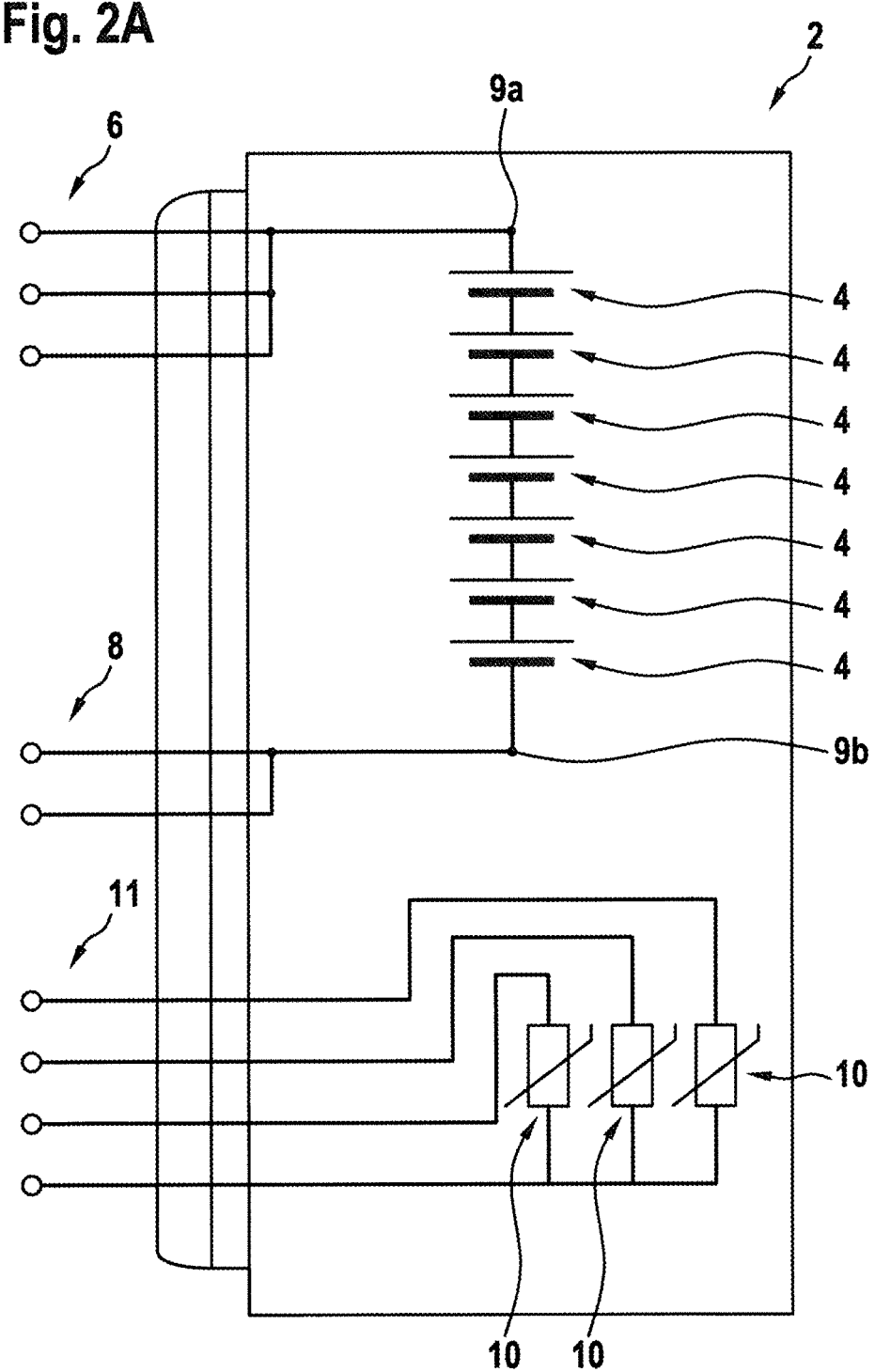
FIG. 2A shows a schematic view of a conventional electric aircraft emergency power supply module.

FIG. 2A shows a schematic view of a conventional electric aircraft emergency power supply module 2.

The conventional electric aircraft emergency power supply module 2, shown in FIG. 2A, comprises seven electric power cells 4 connected in series. The number of seven electric power cells 4 is only exemplary, i.e. the electric aircraft emergency power supply module 2 may comprise more or fewer than seven electric power cells 4.

The electric aircraft emergency power supply module 2 further comprises at least two power supply terminals 6, 8. A first group of power supply terminals 6 is internally coupled with a first pole 9a of the series of electric power cells 14, and a second group of power supply terminals 8 is internally coupled with a second pole 9b of the series of electric power cells 14.

When the electric aircraft emergency power supply module 2 is installed within the aircraft, the power supply terminals 6, 8 are electrically connected with corresponding electric terminals (not shown) provided at the electric interface 5 for electrically coupling the electric aircraft emergency power supply module 2 with the aircraft power supply 109 of the aircraft.

The electric aircraft emergency power supply module 2 further comprises three temperature sensitive elements 10, for example NTC thermal resistors 10 or PTC thermal resistors 10. The electric resistance of each of the thermal resistors 10 changes as a function of its temperature. In consequence, the temperature sensitive elements 10 allow for sensing temperatures at the electric aircraft emergency power supply module 2. The temperature sensitive elements 10 may in particular allow for sensing temperatures of the electric power cells 4.

The temperature sensitive elements 10 are electrically connected with status indication terminals 11 provided at the outer periphery of the electric aircraft emergency power supply module 2. When the electric aircraft emergency power supply module 2 is installed within the aircraft, the status indication terminals 11 are electrically connected with corresponding terminals (not shown) provided at the electric interface 5 for transmitting temperature information provided by the temperature sensitive elements 10 to the charge monitor 7.

The temperature information, provided by the temperature sensitive elements 10, allows the charge monitor 7 to control the charging of the electric power cells 4 as a function of their temperature, as detected by the temperature sensitive elements 10.

The aircraft power supply 109 and the charge monitor 7 may be implemented as two separate components, or they may be provided as integral parts of the electric power supply system 102.

In a conventional electric aircraft emergency power supply module 2, as it is depicted in FIG. 2A, the electric power cells 4 are usually of the NiCd-type (nickel-cadmium type). In consequence, the charge monitor 7 installed within the aircraft 100 is configured for controlling the charging and discharging of electric power cells 4 based on the charging characteristics, in particular based on a temperature over charging level function, of electric power cells 4 of the NiCd-type.

Figure 2B:
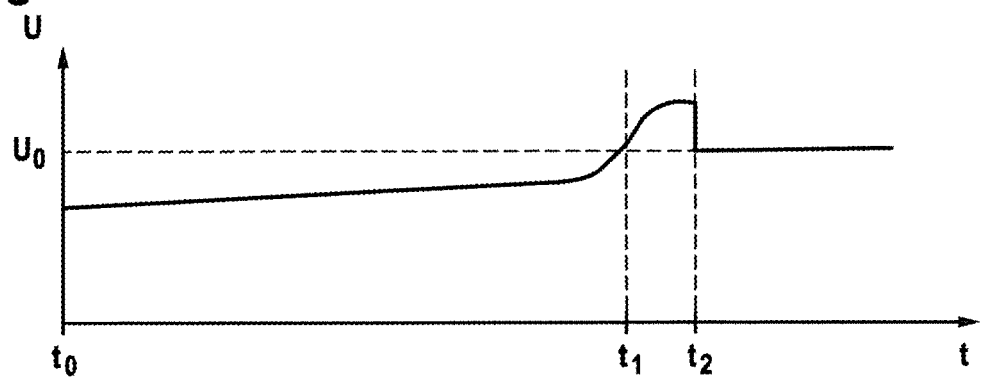
FIGS. 2B to 2D show diagrams illustrating the voltage, the temperature and the charging current of a power cell of the NiCd-type as a function of time when charged with a conventional electric aircraft emergency power supply module as it is depicted in FIG. 2A.
Figure 2C:
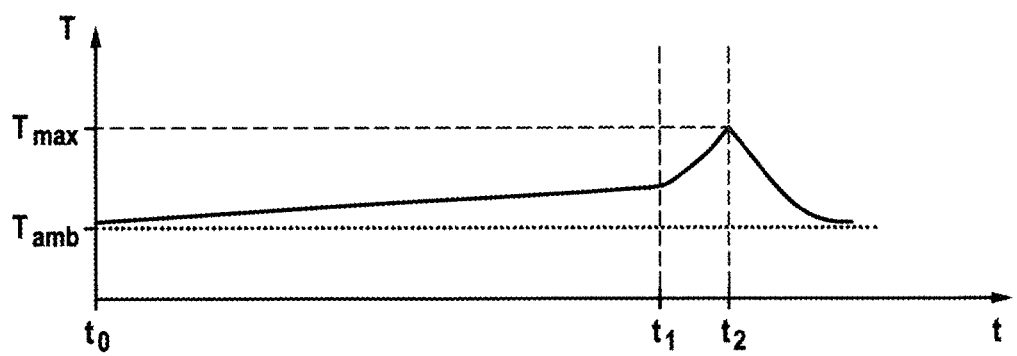
Figure 2D:
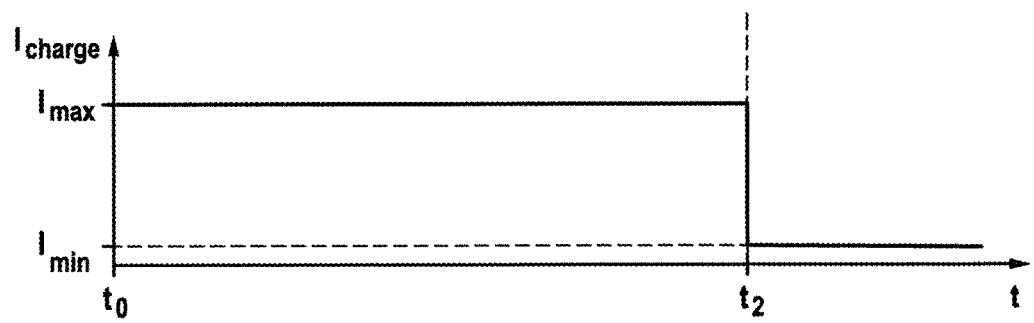

FIGS. 2B to 2D illustrate an exemplary process of charging a power cell 4 of the NiCd-type with a conventional electric aircraft emergency power supply module 2 as depicted in FIG. 2A.

FIG. 2B is a diagram showing the voltage U of the power cell 4 as a function of time t, FIG. 2C is a diagram showing the temperature T of the power cell 4 as a function of time t, and FIG. 2D is a diagram showing the charging current Icharge applied to the power cell 4 as a function of time t.

In a time period between t0 and t1, the power cell 4 is normally or rapidly charged by applying a first charging current Imax to the power cell 4 (see FIG. 2D). During said time period t0≤t≤t1, the voltage U (see FIG. 2B) and the temperature T (see FIG. 2C) of the power cell 4 increase only slowly over time t.

At time t1 the power cell 4 is fully charged. As the first charging current Imax is still applied to the power cell 4, the voltage U (FIG. 2B) and the temperature T (FIG. 2C) of the power cell 4 increase rapidly over time t.

At time t2 the temperature T of the power cell 4, as it is detected by one of the temperature sensitive elements 10 of the electric aircraft emergency power supply module 2, reaches a threshold temperature Tmax. A corresponding output is supplied from the temperature sensitive element 10 via the status indication terminals 11 to the charge monitor 7 installed within the aircraft 100.

When the detected temperature T reaches the threshold temperature Tmax, the charge monitor 7 switches the charging current Icharge applied to the power cell 4 from the first charging current Imax, which is applied to the power cell 4 during normal or rapid charging, to a second charging current Imin, which is considerably smaller than the first charging current Imax (see FIG. 2D).

The level of the second charging current Imin may, for example, be 1/30 to 1/10, in particular 1/20 of the level of the first charging current Imax. The second charging current Imin may in particular be a very small "trickle charging current", which compensates only for the self-discharging of the power cell 4.

As a result of reducing the charging current Icharge, applied to the power cell 4, to the smaller second charging current Imin, the voltage U of the power cell 4 drops to the nominal voltage U0 of a fully charged power cell 4 of said type, and the temperature T of the power cell 4 drops to a value close to the ambient temperature Tamb of the power cell 4, i.e. substantially no additional heat is generated by applying the small second charging current Imin to the power cell 4.

A charging process as it is schematically illustrated in FIGS. 2B to 2D reliably prevents overcharging the power cells 4.

Figure 3A:
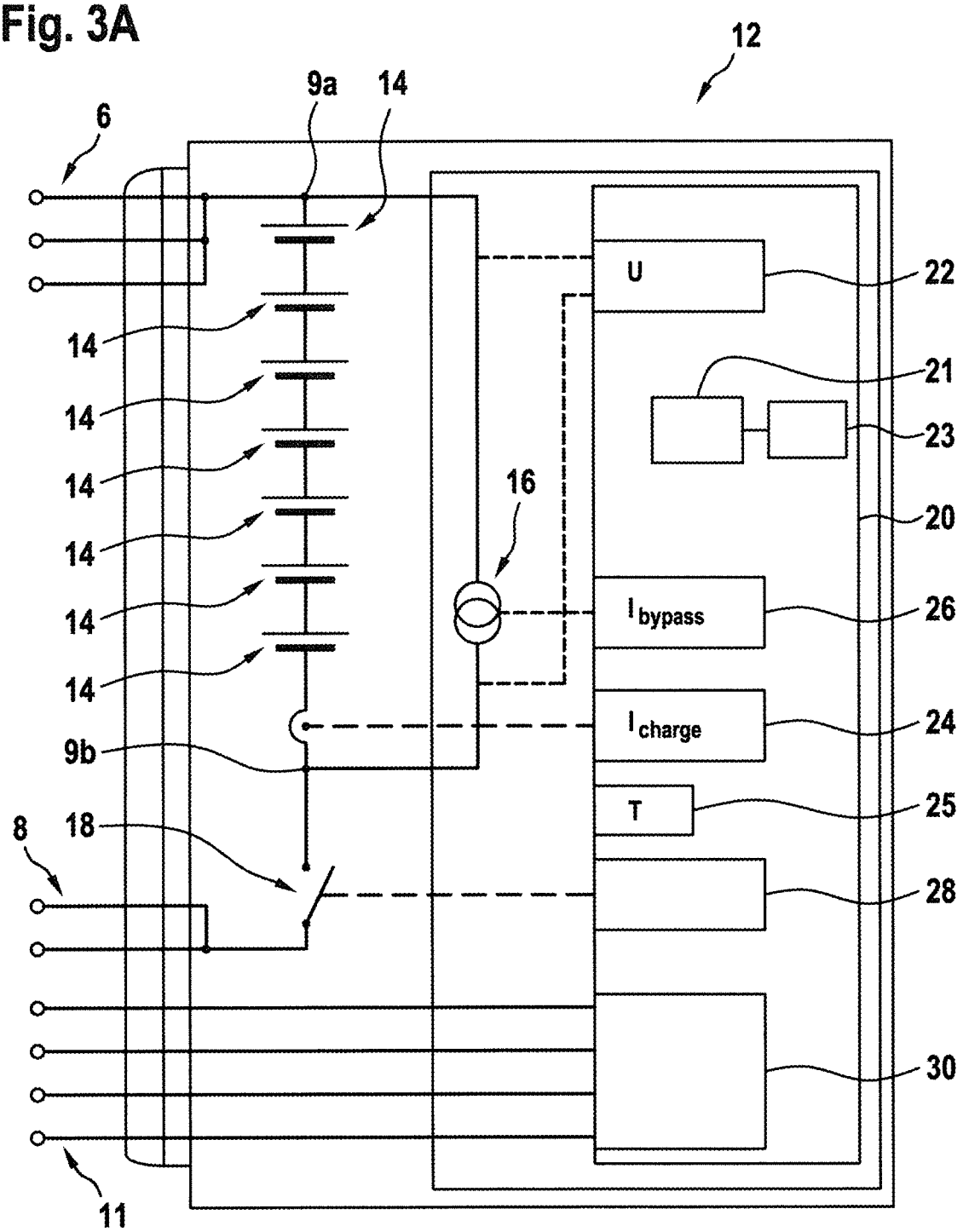
FIG. 3A shows a schematic view of an electric aircraft emergency power supply module according to an exemplary embodiment of the invention.

FIG. 3A depicts a schematic view of an electric aircraft emergency power supply module 12 according to an exemplary embodiment of the invention.

The electric aircraft emergency power supply module 12 shown in FIG. 3A also comprises seven electric power cells 14 connected in series. The number of seven electric power cells 14 shown in FIG. 3A is only exemplary, and the electric aircraft emergency power supply module 12 may comprise more or fewer than seven electric power cells 14. Alternative or additionally, the electric aircraft emergency power supply module 12 may comprise electric power cells 14 which are connected in parallel.

In an electric aircraft emergency power supply module 12 according to exemplary embodiments of the invention, the electric power cells 14 need not to be of the NiCd-type, but may be of a different type. The electric power cells 14 may in particular be of the NiMH-type (nickel-metal hydride type).

The electric aircraft emergency power supply module 12 also comprises at least two power supply terminals 6, 8. A first group of power supply terminals 6 is internally coupled with a first pole 9a of the series of electric power cells 14, and a second group of power supply terminals 8 is internally coupled with a second pole 9b of the series of electric power cells 14.

When the electric aircraft emergency power supply module 12 is installed within the aircraft, the power supply terminals 6, 8 are electrically connected with corresponding electric terminals (not shown) provided at the electric interface 5 for electrically coupling the electric aircraft emergency power supply module 12 with an aircraft power supply 109 of the aircraft.

The electric aircraft emergency power supply module 12 comprises an electric bypass circuit 16 and at least one isolation switch 18. The electric bypass circuit 16 allows for selectively bypassing the electric power cells 14. The at least one isolation switch 18 allows for selectively connecting the electric power cells 14 with at least one of the power supply terminals 6, 8 and disconnecting the electric power cells 14 from at least one of the power supply terminals 6, 8.

The electric aircraft emergency power supply module 12 further comprises a controller 20.

The controller 20 includes or is coupled with a voltmeter 22 and an ammeter 24. The voltmeter 22 allows for measuring the voltage U of the electric power cells 14, and the ammeter 24 allows for measuring an electric current I flowing through the electric power cells 14.

In order to allow measuring the voltage U of the electric power cells 14, without the measurement being distorted by a charging current Icharge flowing through the electric power cells 14, the controller 20 comprises a bypass controller 26, which is configured for controlling the electric bypass circuit 16. When the electric bypass circuit 16 is activated, any charging current Icharge supplied from the aircraft power supply 109 via the power supply terminals 6, 8 is bypassed by the electric power cells 14 through the electric bypass circuit 16. As a result, the internal voltage Uint of the electric power cells 14 may be measured, without being distorted by the charging current Icharge.

The controller 20 further includes an isolation switch activator 28, which allows for selectively activating and deactivating the isolation switch 18 for selectively connecting and disconnecting the electric power cells 14 to/from the power supply terminals 6, 8, respectively.

The controller 20 also includes at least one temperature sensor 25 for detecting the temperature of the electric aircraft emergency power supply module 2, in particular the temperature of the electric power cells 4.

The controller 20 is configured for determining the charging state of the electric power cells 4 from the outputs provided by the voltmeter 22, the ammeter 24 and/or the at least one temperature sensor 25.

The controller 20 further includes a simulator 30, which is configured for simulating the electric behavior of at least one temperature sensitive element 10, as it is provided in a conventional electric aircraft emergency power supply module 2 (see FIG. 2A).

The simulator 30 is in particular configured for simulating the electric behavior of at least one temperature sensitive element 10 as a function of the determined charging level of the electric power cells 14. The simulator 30 is further configured for providing an output at the status indication terminals 11 of the electric aircraft emergency power supply module 2.

The simulator 30 may be a dedicated electric simulator circuit, which has been designed for providing the desired functionalities. The simulator 30 may also be provided as a software program, which is executed by a suitable microprocessor 21.

The controller 20 may in particular comprise at least one microprocessor 21, and the desired functionalities of the controller 20, including the functionalities of the simulator 30, may be realized by one or more software programs, which are executed by said at least one microprocessor 21.

The simulator 30 is configured such that the outputs provided at the status indication terminals 11 cause the charge monitor 7 of the electric power supply system 102 of the aircraft to control the charging of the electric power cells 14 as a function of the current charging state of the electric power cells 14.

In other words, the outputs provided by the simulator 30 at the status indication terminals 11 in general do not correspond to the actual temperatures of the electric power cells 14, and the outputs provided by the simulator 30 generally also do not correspond to the temperatures of electric power cells 4 of the NiCd-type, as they are employed in a conventional electric aircraft emergency power supply module 2, having the determined charging state.

Instead, the simulator 30 is configured for providing, based on the determined current charging state of the electric power cells 14, outputs at the status indication terminals 11 which cause the charge monitor 7 to control the charging of the electric power cells 14 in accordance with a predefined charging procedure as it is defined for the actually employed type and the currently determined charging state of said electric power cells 14. Controlling the charging of the electric power cells 14 may in particular include setting a charging voltage Ucharge and/or setting a charging current Icharge applied to the electric power cells 14. The charge monitor 7 may cause the aircraft power supply 109 to provide the desired charging/may co-operate with the aircraft power supply 109 to provide the desired charging.

An electric aircraft emergency power supply module 12 including a controller 20 with a simulator 30 according to an exemplary embodiment of the invention allows for replacing a conventional electric aircraft emergency power supply module 2, comprising at least one electric power cell 4 of a first type, for example the NiCd-type, as it is depicted in FIG. 2A, with an electric aircraft emergency power supply module 12, comprising at least one electric power cell 14 of a second type, such as the NiMH-type, without modifying or replacing the charge monitor 7 of the electric power supply system 102.

In consequence, a conventional electric aircraft emergency power supply module 2, comprising electric power cells 4 of the first type, may be replaced quickly and easily with a new electric aircraft emergency power supply module 12, which may comprise different kinds of electric power cells 4, in particular electric power cells 4 of the NiMH-type.

Since overcharging will damage and/or shorten the lifetime of the electric power cells 14, it is desirable to reliably prevent overcharging the electric power cells 14.

In the following, an example of an optimized charging process for charging electric power cells 14, as it may be employed by a controller 20 according to an exemplary embodiment of the invention, is described.

For performing a charging process which reliably prevents overcharging the electric power cells 14, it is good to know the current charging state of the electric power cells 14.

The no-load voltage Umax of the electric power cell 14, i.e. the voltage Umax at which loading the electric power cell 14 is to be stopped in order to prevent overcharging, may be a function of the temperature T of the electric power cell 14. The no-load voltage Umax also depends on the type and on the manufacturer of the electric power cell 14. The no-load voltage characteristic of the electric power cell 14 installed within the electric aircraft emergency power supply module 12, i.e. the no-load voltage Umax(T) as a function of the temperature T, is provided by the manufacturer of the electric power cell 14 and stored within a memory 23 the controller 20.

For performing an open-circuit voltage measurement, the controller 20 causes the electric bypass circuit 16 and the bypass controller 26 to bridge the charging current Icharge supplied from the aircraft power supply 109 to the electric power cells 14 via the power supply terminals 6, 8. The bypass controller 26 controls the bypass current Ibypass flowing through the electric bypass circuit 16, so that the electric current Icell flowing through the electric power cells 14 becomes zero, although the aircraft power supply 109 continues to supply a constant charging current Icharge to the electric aircraft emergency power supply module 12.

As a result of bypassing the charging current Icharge by the electric power cells 14, the voltage U, measured between the poles 9a, 9b of the electric power cells 14, represents the internal voltage Uint of the electric power cells 14.

The controller 20 calculates the loading state of the electric power cells 14 from the internal voltage Uint measured by the voltmeter 22 and the temperature T measured by the at least one temperature sensor 25.

Based on a predefined charging characteristic of the power cells 14 actually installed within the electric aircraft emergency power supply module 12, which is stored within the memory 23 of the controller 20, the controller 20 then determines an appropriate charging current Icharge from the calculated loading state of the electric power cells 14 and the current temperature T measured by the at least one temperature sensor 25. The charging current Icharge is set so that there is no risk of overcharging and/or damaging the electric power cells 14.

The determined value for the appropriate charging current Icharge is supplied to the simulator 30. Based on this information, the simulator 30 generates and provides outputs at the status indication terminals 11 causing the charge monitor 7 of the electric power supply system 102 to supply the determined charging current Icharge to the electric power cells 14.

The controller 20 may in particular generate the outputs at the status indication terminals 11 in a three-step procedure. In a first step, the controller 20 may determine an appropriate/desired charging current Icharge on the basis of the current charging level of the electric power cells 14. In a second step, the desired charging current may be an input to a temperature vs. charging current relation of a conventional emergency power supply module, in particular an input to a temperature vs. charging current relation of an electric power cell of a conventional emergency power supply module, further in particular an input to a temperature vs. charging current relation of an electric power cell of the NiCd type. The temperature vs. charging current relation may be any suitable description of which charging current is supplied to a conventional emergency power supply module by the charge monitor as a function of the temperature. Further in particular, the temperature vs. charging current relation may also be seen as a description of the charging control implemented in the charge monitor, in particular as a description of the charging currents the charge monitor supplies depending on the communicated temperature. In the second step, a temperature may be determined that is suitable for causing the charge monitor to supply the desired charging current. In a third step, the simulator 30 may simulate the electric behavior of at least one temperature sensitive element to indicate said determined temperature. Said determined temperature may be seen as an encoded message to the charge monitor to supply the desired charging current.

The controller 20 and the charge monitor 7 are in particular configured for switching the charging current Icharge from a high charging current Ihigh, when operating in a rapid charging mode, to a low charging current Ilow, which is smaller than the high charging current Ihigh, in a low charging mode. The low charging mode may in particular be a trickle charging mode in which only a very small trickle charge current Ilow=Itrickle is supplied to the at least one electric power cell 14, in order to compensate for a self-discharging of the at least one electric power cell 14.

Figure 3B:
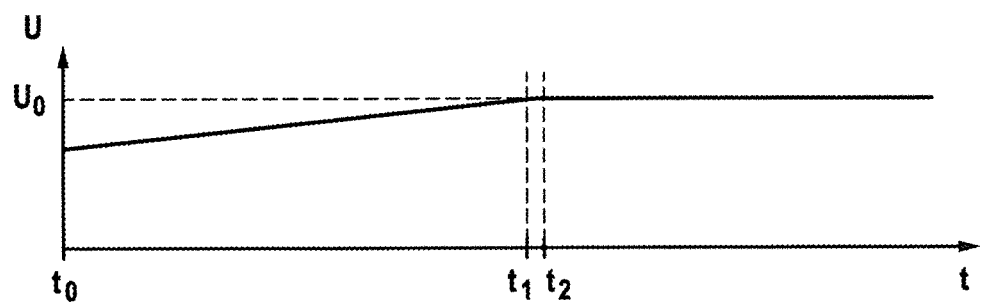
FIGS. 3B to 3D show diagrams illustrating the voltage, the temperature and the charging current of a power cell of the NiMH-type as a function of time when charged with an electric aircraft emergency power supply module according to an exemplary embodiment of the invention.
Figure 3C:
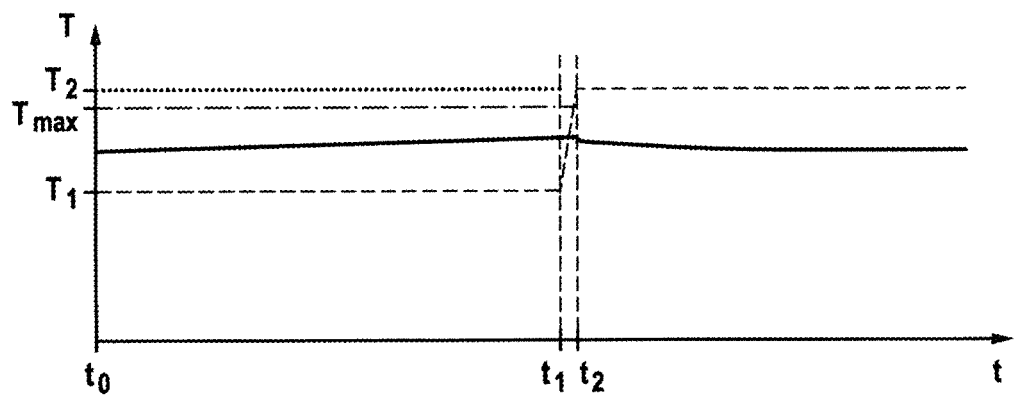
Figure 3D:
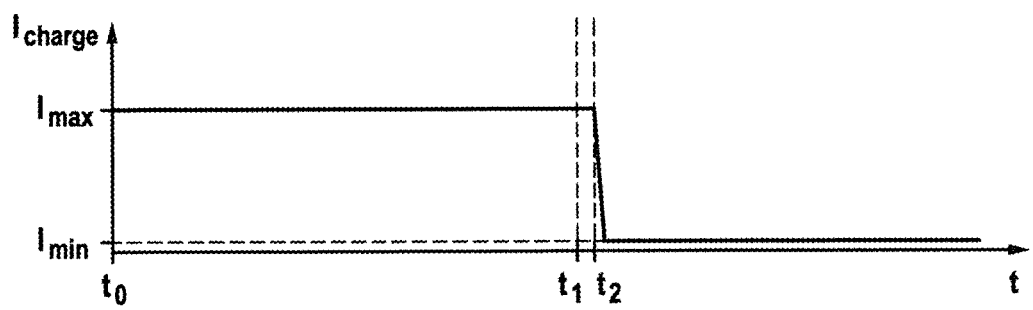

FIGS. 3B to 3D illustrate an exemplary process of charging a power cell 4 of the NiMH-type employing an electric aircraft emergency power supply module 2 according to an exemplary embodiment of the invention, for example using an electric aircraft emergency power supply module 2 as depicted in FIG. 3A.

FIG. 3B is a diagram showing the voltage U of the power cell 4 as a function of time t. FIG. 3C is a diagram showing the temperature T of the power cell 4 (solid line) as well as the temperature simulated by the simulator 30 (dashed line) as a function of time t. FIG. 3D is a diagram showing the charging current Icharge applied to the power cell 4 as a function of time t.

In a time period between t0 and t1, the power cell 4 is normally or rapidly charged by applying a first charging current Imax to the power cell 4. During said time period t0≤t≤t1, the voltage U of the power cell 4 increases substantially linearly over time t (see FIG. 3B), and the temperature T of the power cell 4 increase only very slowly over time t (see FIG. 3C). In the time period between t0 and t1, the simulator 30 provides an output to the charge monitor 7 simulating a low temperature Tlow, in particular a temperature Tlow corresponding to a not fully charged state of a power cell 4 of the NiCd-type. This is indicated by the dashed line in FIG. 3C.

At time t1 the power cell 4 is fully charged. The fully charged state of the power cell 4 is detected by the controller 20 when the voltage U measured by the voltmeter 22 reaches a predefined threshold voltage U0. The predefined threshold voltage U0 has been set in advance in accordance with a specification provided by the manufacturer of the power cell 4.

When the controller 20 detects that the power cell 4 is fully charged, the controller 20 causes the simulator 30 to provide an output to the charge monitor 7 via the status indication terminals 11 which corresponds to a temperature Thigh associated with a fully charged state of a power cell 4 of the NiCd-type, i.e. a temperature Thigh which is higher than the threshold temperature Tmax shown in FIG. 2C. This is illustrated by the dashed line in FIG. 3C.

When the charge monitor 7 receives an output from the simulator 30 indicating a temperature Thigh, which is higher than the threshold temperature Tmax associated with a fully charged state of a power cell 4 of the NiCd-type, the charge monitor 7 switches the charging current Icharge, applied to the power cell 4, from the first charging current Imax, which is applied during normal or rapid charging, to a second charging current Imin, which is considerably smaller than the first charging current Imax (see FIG. 3D). The second charging current Imin may for example be 1/30 to 1/10, in particular 1/20, of the first charging current Imax. The second charging current Imin may in particular be a very small "trickle charging current", which compensates only for the self-discharging of the power cell 4.

As a result of reducing the charging current Icharge to the smaller second charging current Imin, the voltage U of the power cell 4 does not exceed the predefined nominal voltage U0 of a fully charged power cell 4, and the temperature T of the power cell 4, which is indicated by the solid line in FIG. 3C, does not increase further. Instead, the temperature T of the power cell 4 drops to a temperature T close to the ambient temperature Tamb. In other words, substantially no additional heat is generated by applying the small second charging current Imin to the power cell 4.

A charging process as it is schematically illustrated in FIGS. 3B to 3D reliably prevents overcharging the power cells 4. It therefore results in a long lifetime of power cells 4 of the NiMH-type.

In the charging process illustrated in FIGS. 3B to 3D, the charging current Icharge is switched between a first charging current Ihigh and a second charging current Ilow. In a more sophisticated charging scheme, the simulated temperature T and the resulting charging current Icharge may be adjusted in more steps or even continuously as a function of the detected voltage U of the power cell 4.

Depending on the type and the current charging state of the electric power cells 14, even the low trickle charge current Ilow may be bypassed by the electric power cells 14 via the electric bypass circuit 16, in order to prevent the trickle charge current from overloading the electric power cells 14.

As the charge monitor 7 provided in the aircraft 100 is controlled by simulated temperature signals provided via the status indication terminals 11, conventionally used power cells 4 of the NiCd-type may be replaced by power cells 4 of another type, in particular by power cells 4 of the NiMH-type, without changing or modifying the charge monitor 7.

Figure 4A:
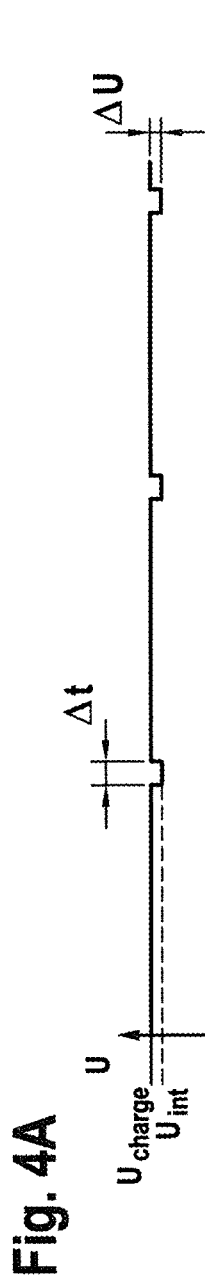
FIGS. 4A to 4C show diagrams illustrating the voltage, the charging current and the bypass current in an electric aircraft emergency power supply module according to an exemplary embodiment of the invention as a function of time.
Figure 4B:
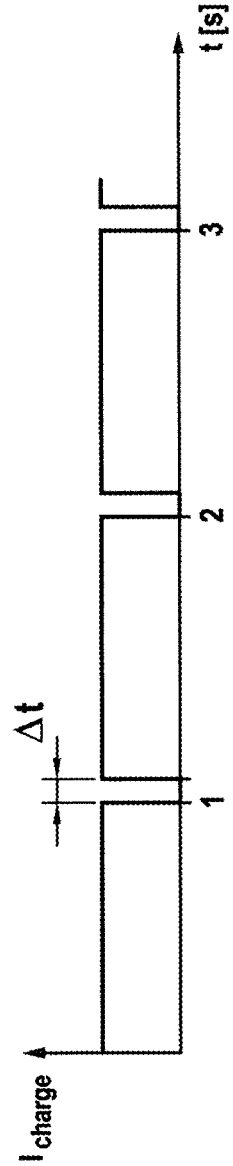
Figure 4C:
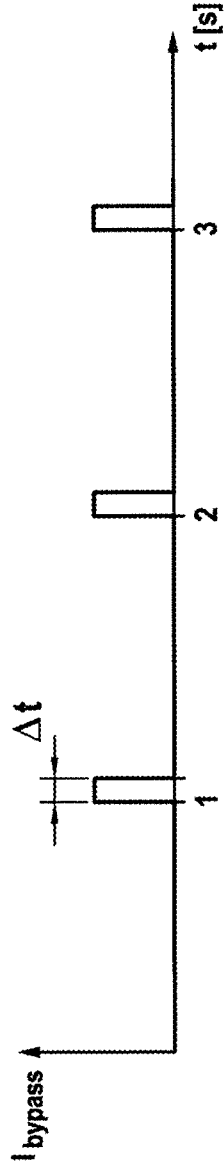

FIGS. 4A to 4C exemplarily illustrate the voltage U between the poles 9a, 9b of the electric power cells 14 (FIG. 4A), the charging current Icharge (FIG. 4B) flowing through the electric power cells 14, and the bypass current Ibypass flowing through the electric bypass circuit 16 (FIG. 4C) as a function of time t.

FIGS. 4A to 4C illustrate that the charging current Icharge is bypassed approximately every second for a bypass time period Δt, in order to allow the voltage U of the electric power cells 14 to drop from the charging voltage Ucharge to the internal voltage Uint of the electric power cells 14.

In the example illustrated in FIGS. 4A to 4C, the length of the bypass time periods Δt, during which the charging current Icharge is bypassed by the electric power cells 14 through the electric bypass circuit 16, is approximately 50 ms. This is, however, only an example and the length of the bypass time periods Δt may be longer or shorter than 50 ms. The appropriate length of the bypass time periods Δt depends in particular on the characteristics of the power cells 14.

The length of the bypass time periods Δt needs to be long enough for allowing the voltage U at the electric power cells 14 to assume the level of the internal voltage Uint of the electric power cells 14. The minimum length of the bypass time periods Δt depends on the internal structure and the materials used within the electric power cells 14. It is therefore a characteristic parameter of the respective type of electric power cell, which is provided by the manufacturer of electric power cells and stored within the memory 23 of the controller 20.

In order to prevent a premature degeneration of the power cells 14, not only overloading, but also underloading of the power cells 14 should be avoided.

In case the internal voltage Uint of an electric power cell 14 falls below a predetermined threshold Umin, for example a threshold of Umin=1 V, there is a risk of permanent damage of the electric power cell 14, which may result in a permanent degradation of the capacity of the electric power cell 14.

In order to prevent degeneration of the power cells 14 due to underloading, the controller 20 may be configured for monitoring the internal voltage Uint of the electric power cells 14 not only over the course of charging, but also over the course of discharging. The controller 20 may in particular be configured for opening the isolation switch 18 if the detected internal voltage Uint of the electric power cells 14 drops below a predetermined threshold Umin, in order to avoid further discharging and potentially damaging the electric power cells 14. Alternatively or additionally, the controller 20 may be configured for providing a signal, indicating that the predetermined threshold Umin of the internal voltage Uint has been reached.

The controller 20 may in particular be configured for providing a warning signal, indicating that a first predetermined threshold Umin1 has been reached, and it may be further configured for opening the isolation switch 18, when a second predetermined threshold Umin2 has been reached. The second predetermined threshold Umin2 may be equal or lower than the first predetermined threshold Umin1.

In the exemplary embodied of an electric aircraft emergency power supply module 12 depicted in FIG. 3A, the plurality of electric power cells 14 are monitored, bypassed, charged and discharged collectively, i.e. the same charging and discharging currents Icharge, Idischarge are flowing through all electric power cells 14.

In order to prevent the electric power cells 14 even more efficiently from overcharging and/or undercharging, it is possible to provide a configuration of an electric aircraft emergency power supply module 12 which allows individually charging and/or discharging each of the plurality of electric power cells 14.

Figure 5:
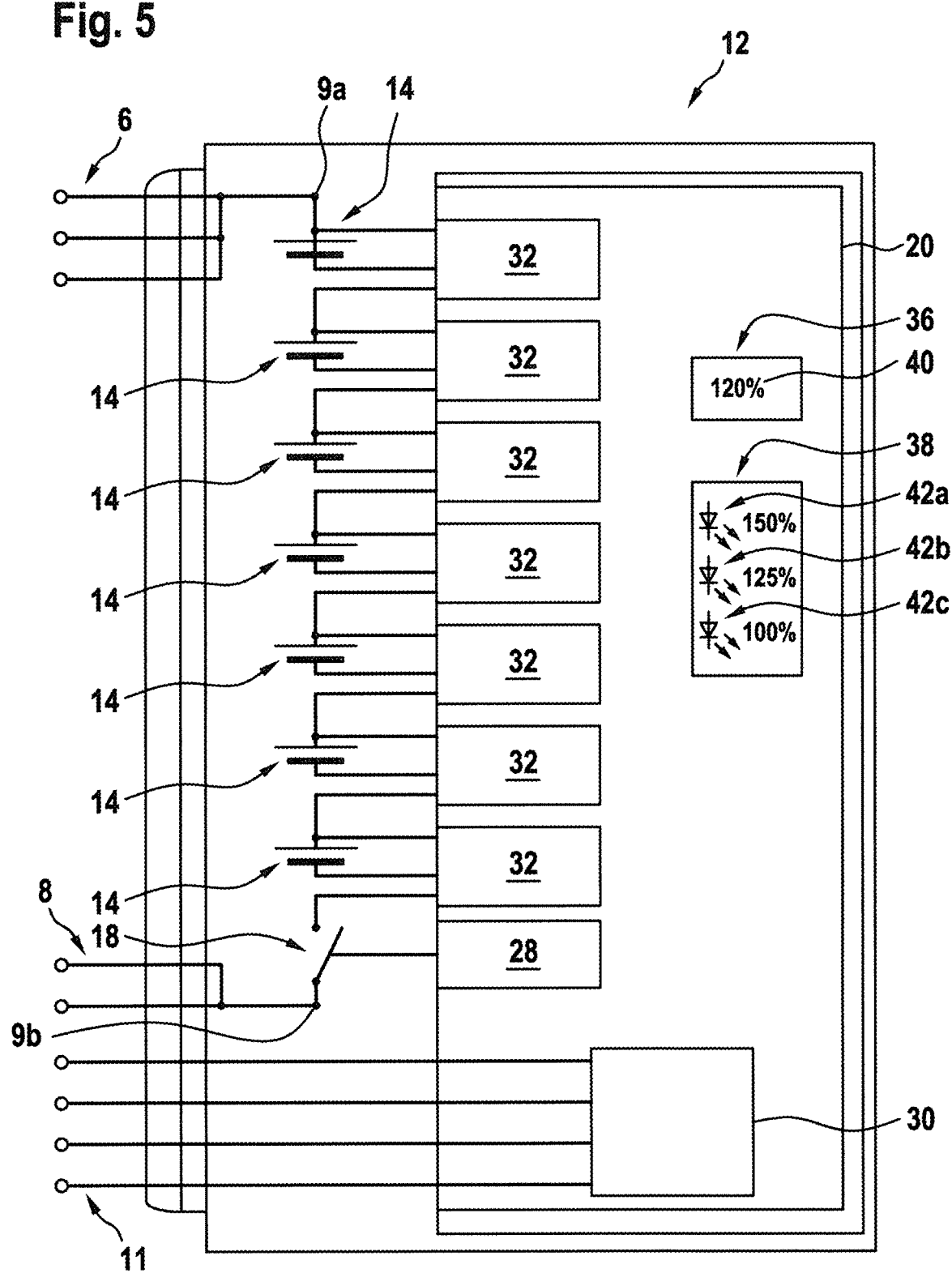
FIG. 5 shows a schematic view of an exemplary embodiment of an electric aircraft emergency power supply module according to another exemplary embodiment of the invention.

FIG. 5 schematically depicts an exemplary embodiment of such an electric aircraft emergency power supply module 12.

The electric aircraft emergency power supply module 12 shown in FIG. 5 also comprises seven electric power cells 14 connected in series.

Again, the number of seven electric power cells 14 is only exemplary, and the electric aircraft emergency power supply module 12 may comprise more or fewer than seven electric power cells 14. Additionally or alternatively, the electric aircraft emergency power supply module 12 may comprise electric power cells 14 which are connected in parallel.

The electric aircraft emergency power supply module 12 also comprises at least two power supply terminals 6, 8. A first group of power supply terminals 6 is internally coupled with a first pole 9*a* of the series of electric power cells 14, and a second group of power supply terminals 8 is internally coupled with a second pole 9*b* of the series of electric power cells 14.

The electric aircraft emergency power supply module 12 further comprises a controller 20 including a simulator 30, which is configured for simulating an electric behavior of temperature sensitive elements 10 and for providing corresponding status outputs at the status indication terminals 11 of the electric aircraft emergency power supply module 2, as it has been described with respect to the embodiment depicted in FIG. 3A.

The controller 20 also includes an isolation switch activator 28, which allows selectively activating and deactivating the isolation switch 18 for collectively connecting and disconnecting the electric power cells 14 with/from the power supply terminals 6, 8.

Deviating from the embodiment depicted in FIG. 3A, the controller 20 of the electric aircraft emergency power supply module 12, depicted in FIG. 5, comprises a plurality of individual power cell controllers 32.

Each individual power cell controller 32 is associated with and configured for individually controlling the charging and/or the discharging of a single electric power cell 14 of the plurality of electric power cells 14.

Figure 6:
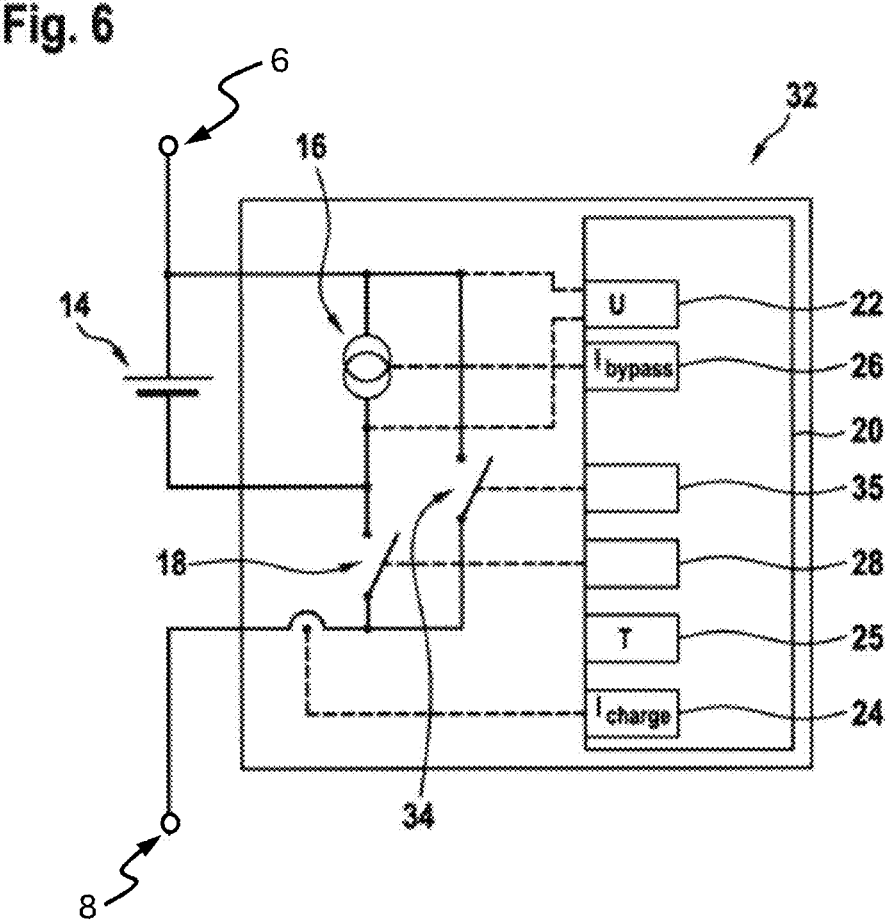
FIG. 6 shows a schematic view of an individual power cell controller, as it may be employed in an electric aircraft emergency power supply module shown in FIG. 5.

FIG. 6 shows a more detailed view of an individual power cell controller 32.

Each individual power cell controller 32 comprises an individual electric bypass circuit 16, which is controlled by a corresponding bypass controller 26. The individual electric bypass circuit 16 of each individual power cell controller 32 is configured for selectively bypassing a single electric power cell 14.

Each individual power cell controller 32 further comprises a voltmeter 22, an ammeter 24, and a temperature sensor 25, which are configured for measuring the voltage U, the electric current I and the temperature T of the electric power cell 14 associated with the respective individual power cell controller 32.

Each individual power cell controller 32 also includes an individual isolation switch 18 and an associated individual isolation switch activator 28, which allow for selectively and individually connecting the associated electric power cell 14 with the power supply terminals 6, 8 and disconnecting the associated electric power cell 14 from the power supply terminals 6, 8.

The individual power cell controller 32 further comprises a bypass switch 34, which allows for bypassing the deactivated electric power cell 14. Such a bypass switch 34 allows for charging and discharging the other electric power cells 14 of the plurality of electric power cells 14, when at least one of the electric power cells 14 is deactivated by opening the isolation switch 18 of said at least one electric power cell 14. The bypass switch 34 is controlled by a bypass switch controller 35 comprised in the individual power cell controller 32.

When a single isolation switch 18 is opened and the corresponding bypass switch 34 is closed, the corresponding electric power cell 14 is electrically isolated from the other electric power cells 14, and the electric aircraft emergency power supply module 12 operates with one electric power cell 14 less.

An electric aircraft emergency power supply module 12 comprising individual power cell controllers 32 for each electric power cell 14, as it is depicted in FIGS. 5 and 6, allows for charging one or more of the electric power cells 14, while simultaneously discharging the other electric power cells 14.

In a configuration in which the electric aircraft emergency power supply module 12 comprises at least one electric power cell 14 more than necessary for providing the required nominal electric output, at least one of the electric power cells 14 may be temporarily isolated from the other electric power cells 14 for being individually charged and/or discharged, while the electric aircraft emergency power supply module 12 continues to provide the required nominal electric output.

In a configuration in which the electric aircraft emergency power supply module 12 comprises at least one electric power cell 14 more than necessary for providing the required nominal electric output, a mode of operation in which at least one of the electric power cells 14 is temporarily isolated from the other electric power cells 14 may in particular be employed for monitoring the capacity of the electric power cells 14, while still providing the required nominal electric output of the electric aircraft emergency power supply module 12.

For monitoring the capacity of the electric power cells 14, one electric power cell 14 after the other may be temporarily isolated from the plurality of electric power cells 14, and the isolated electric power cell 14 is individually discharged and recharged, with the discharging current Idischarge and/or the charging current Icharge being monitored.

The maximum capacity Qi of the individual electric power cell 14 is then calculated by integrating the monitored discharging current Idischarge and/or the charging current Icharge over the time, as it is observed for completely discharging/charging the electric power cell 14. The total capacity Qtot of the electric aircraft emergency power supply module 12 may be calculated by repeating this procedure for every electric power cell 14 and adding up the calculated maximum capacities Qi of all electric power cells 14 of the electric aircraft emergency power supply module 12.

The calculated total capacity Qtot may be displayed on a suitable display device 36, 38 provided at the electric aircraft emergency power supply module 12 (see FIG. 5). The display device 36 may comprise a numerical display 40, an alphanumerical display 40 and/or a plurality of indicator lights 42a-42c, in particular LED lights 42a-42c, wherein each indicator light 42a-42c indicates a respectively associated capacity level of the electric power cells 14.

The calculated total capacity Qtot of the electric power cells 14 of the electric aircraft emergency power supply module 12 may also be transmitted to a display (not shown) installed within the aircraft, in particular within the cockpit 105 of the aircraft, where it is visible to the pilots.

The calculated total capacity Qtot of the electric power cells 14 of the electric aircraft emergency power supply module 12 may by compared with a predefined minimum capacity Qmin, and an alarm signal requesting replacement of electric power cells 14 may be issued in case the calculated total capacity Qtot of the electric aircraft emergency power supply module 12 is found to be below the predefined minimum capacity Qmin.

In the exemplary configuration of an electric aircraft emergency power supply module 12 depicted in FIGS. 5 and 6, an individual electric power cell 14 is associated and connected with each individual power cell controller 32, respectively.

In a further embodiment, which is not explicitly illustrated in the figures, the electric aircraft emergency power supply module 12 comprises a plurality of individual power cell controllers 32, similar to the embodiment depicted in FIG. 5. Deviating from the embodiment depicted in FIG. 5, a group of electric power cells 14 comprising more than one electric power cell 14 is associated and connected with each of the individual power cell controllers 32, respectively, so that each group of electric power cells 14 may be charged and discharged individually. The electric power cells 14 of each group may be connected in series and/or in parallel with each other.

In such a embodiment, the number of individual power cell controllers 32 is smaller than the number of electric power cells 14. Such a configuration is therefore less expensive than the configuration depicted in FIGS. 5 and 6.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An electric aircraft emergency power supply module comprising:
   a plurality of electric power cells, which are connected, for storing and supplying electric energy; and
   a controller for determining a charging level of at least one electric power cell of the plurality of electric power cells and for controlling charging and discharging of the at least one electric power cell,
   wherein the controller comprises:
   a plurality of individual power cell controllers, each being associated with and configured for individually controlling the charging and the discharging of a single electric power cell of the plurality of electric power cells; and
   a simulator, which is configured for simulating an electric behavior of at least one temperature sensitive element as a function of charging level of the at least one electric power cell of the plurality of electric power cells,
   wherein the plurality of electric power cells are connected in series and each individual power cell controller of the controller comprises:

an individual electric bypass circuit, which is controlled by a corresponding bypass controller and is configured for selectively bypassing a single electric power cell;

an individual isolation switch and an associated individual isolation switch activator, which allow for selectively and individually connecting the associated electric power cell with power supply terminals and disconnecting the associated electric power cell from the power supply terminals; and a bypass switch, which allows for bypassing the deactivated electric power cell and which is controlled by the corresponding bypass switch controller.

2. The electric aircraft emergency power supply module according to claim 1, wherein the controller is configured for determining a desired charging current for charging the at least one electric power cell of the plurality of electric power cells from the determined charging level of the at least one electric power cell of the plurality of electric power cells; and wherein the simulator is configured for simulating the electric behavior of the at least one temperature sensitive element for causing an external charge monitor to supply the desired charging current to the electric aircraft emergency power supply module.

3. The electric aircraft emergency power supply module according to claim 1, wherein the simulator is configured for simulating the electric behavior of the at least one temperature sensitive element based on a temperature vs. charging current relation of at least one electric power cell of the plurality of electric power cells which is of a NiCd-type.

4. The electric aircraft emergency power supply module according to claim 1, wherein the at least one electric power cell of the plurality of electric power cells comprises at least one electric power cell of a NiMH-type.

5. The electric aircraft emergency power supply module according to claim 1, wherein the simulator is configured for simulating the electric behavior of at least one NTC thermal resistor and of at least one PTC thermal resistor.

6. The electric aircraft emergency power supply module according to claim 1, further comprising:

at least two power supply terminals, internally coupled to the plurality of electric power cells and coupleable to an aircraft power supply; and at least two status indication terminals, internally coupled to the simulator and coupleable to a charge monitor of an aircraft, wherein the simulator is configured to output a status signal on the at least two status indication terminals, the status signal being indicative of the simulated electric behavior of at least one temperature sensitive element.

7. The electric aircraft emergency power supply module according to claim 1, further comprising at least one electric bypass circuit configured for selectively bypassing the at least one electric power cell of the plurality of electric power cells, wherein the controller is in particular configured for temporarily bypassing the at least one electric power cell and measuring the voltage (U) of the bypassed electric power cell.

8. The electric aircraft emergency power supply module according to claim 1, further comprising at least one temperature sensor configured for detecting a temperature (T) of the electric aircraft emergency power supply module and a temperature (T) of the at least one electric power cell of the plurality of electric power cells.

9. The electric aircraft emergency power supply module according to claim 1, wherein the controller is configured for determining the charging level of the at least one electric power cell of the plurality of electric power cells from a detected temperature (T) and from a detected voltage (V) of the at least one electric power cell.

10. The electric aircraft emergency power supply module according to claim 1, wherein the controller is configured for selectively charging the at least one electric power cell of the plurality of electric power cells with a high charging current $I_{high}$ in a rapid charging mode or with a low charging current $I_{low}$, which is lower than the high charging current $I_{high}$, in a low charging mode.

11. The electric aircraft emergency power supply module according to claim 1, wherein the controller is configured for determining the maximum load capacity $Q_{max}$ of the at least one electric power cell of the plurality of electric power cells by monitoring a controlled charging and discharging of the at least one electric power cell, and wherein the controller is in particular configured for at least one of:

displaying the determined maximum load capacity $Q_{max}$ of the at least one electric power cell at the electric aircraft emergency power supply module;

providing a capacity signal indicating the determined maximum load capacity $Q_{max}$ of the at least one electric power cell; and comparing the determined maximum load capacity $Q_{max}$ of the at least one electric power cell with a predefined threshold and providing an alarm signal and deactivating the electric aircraft emergency power supply module if the determined maximum load capacity $Q_{max}$ of the at least one electric power cell is below the predefined threshold.

12. The electric aircraft emergency power supply module according to claim 1, wherein each individual power cell controller of the controller further comprises a voltmeter, an ammeter and a temperature sensor, which are configured for measuring the voltage, the electric current and the temperature of the associated electric power cell.

* * * * *